(12) United States Patent
Chi et al.

(10) Patent No.: US 12,481,371 B1
(45) Date of Patent: Nov. 25, 2025

(54) BACKLIGHT MODULE

(71) Applicant: Chicony Power Technology Co., Ltd., New Taipei (TW)

(72) Inventors: Syun-Yuan Chi, New Taipei (TW); Chen-Hao Chiu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 19/006,233

(22) Filed: Dec. 31, 2024

(30) Foreign Application Priority Data

Nov. 22, 2024 (TW) ................... 113145115

(51) Int. Cl.
*G06F 3/02* (2006.01)
*F21V 8/00* (2006.01)

(52) U.S. Cl.
CPC .......... *G06F 3/02* (2013.01); *G02B 6/0021* (2013.01); *G02B 6/0036* (2013.01); *G02B 6/005* (2013.01); *G02B 6/006* (2013.01); *G02B 6/0076* (2013.01)

(58) Field of Classification Search
CPC ..... G02B 6/006; G02B 6/0075; G02B 6/0076
See application file for complete search history.

(56) References Cited

U.S. PATENT DOCUMENTS

| | | |
|---|---|---|
| 2010/0259485 A1 | 10/2010 | Chuang |
| 2020/0401235 A1* | 12/2020 | Liang ................. G02B 6/0036 |
| 2021/0063632 A1* | 3/2021 | Ho ..................... G02B 6/0076 |

FOREIGN PATENT DOCUMENTS

| | | |
|---|---|---|
| CN | 102087573 A | 6/2011 |
| TW | M364876 U | 9/2009 |
| TW | 201329566 A | 7/2013 |
| TW | 201445283 A | 12/2014 |
| TW | 201624515 A | 7/2016 |
| TW | 202109100 A | 3/2021 |
| TW | I750764 B | 12/2021 |
| TW | 202242936 A | 11/2022 |
| TW | I783757 B | 11/2022 |
| TW | 202318167 A | 5/2023 |
| TW | M649262 U | 12/2023 |

* cited by examiner

*Primary Examiner* — Keith G. Delahoussaye
(74) *Attorney, Agent, or Firm* — CKC & Partners Co., LLC

(57) ABSTRACT

A backlight module includes a base layer having first, second, and third openings, first and second light-isolating sheets, first, second, and third light guide sheets, and first and second light-shielding sheets. The first light-isolating sheet is disposed above the base layer and has first and second light-isolating areas and a fourth opening. The first and second light guide sheets are disposed in the first and second light-isolating areas respectively. The first light-shielding sheet is disposed above the first light-isolating sheet and has first and second light-transmitting windows and a fifth opening. The third, fourth, and fifth openings are disposed correspondingly. The second light-isolating sheet is disposed above the first light-shielding sheet and has a third light-isolating area in which the third light guide sheet is disposed. The second light-shielding sheet is disposed above the second light-isolating sheet and has third, fourth, and fifth light-transmitting windows.

16 Claims, 11 Drawing Sheets

BACKLIGHT MODULE

CROSS-REFERENCE TO RELATED APPLICATION

This application claims priority to Taiwan Application Serial Number 113145115, filed Nov. 22, 2024, which is herein incorporated by reference.

BACKGROUND

Technical Field

The present disclosure relates to a backlight module.

Description of Related Art

The touch function row (hereinafter referred to as TFR) module is a new touch application that is used to replace the physical function keys on the keyboard. It is basically a combination product of a "touch pad" and a "backlight module". The TFR module includes a printed circuit board, a reflective sheet, a light guide plate, a light-isolating structure, and an appearance sheet from bottom to top. The layers are usually bonded to each other with water glue. The TFR module has two modes, one is the function mode that replaces the physical function keys, and the other is the media mode that replaces the physical keys that control and adjust the media keys. Both of the above modes allow users to use the TFR module to achieve the functions originally performed on physical keys.

However, when a user's finger touches any icon, since all the icons on the TFR module need to be arranged at equal distances, any icon may be smaller than the finger. This results in the user being unable to immediately recognize whether the correct icon has been successfully pressed when touching or pressing.

Accordingly, how to provide a backlight module to solve the aforementioned problems becomes an important issue to be solved by those in the industry.

SUMMARY

An aspect of the disclosure is to provide a backlight module that can efficiently solve the aforementioned problems.

According to an embodiment of the disclosure, a backlight module includes a base layer, a first light-isolating sheet, a first light guide sheet, a second light guide sheet, a first light-shielding sheet, a second light-isolating sheet, a third light guide sheet, and a second light-shielding sheet. The base layer has a first opening, a second opening, and a third opening. The first light-isolating sheet is disposed above the base layer and has a first light-isolating area, a second light-isolating area, and a fourth opening. The first light guide sheet is disposed in the first light-isolating area. The second light guide sheet is disposed in the second light-isolating area. The first light-shielding sheet is disposed above the first light-isolating sheet and has a first light-transmitting window, a second light-transmitting window, and a fifth opening. The third opening, the fourth opening, and the fifth opening are disposed correspondingly. The second light-isolating sheet is disposed above the first light-shielding sheet and has a third light-isolating area. The third light guide sheet is disposed in the third light-isolating area. The second light-shielding sheet is disposed above the second light-isolating sheet and has a third light-transmitting window, a fourth light-transmitting window, and a fifth light-transmitting window. The first light-transmitting window and the third light-transmitting window are disposed correspondingly to form a first light output path. The second light-transmitting window and the fourth light-transmitting window are disposed correspondingly to form a second light output path. The fifth light-transmitting window forms a third light output path.

In an embodiment of the disclosure, the first light guide sheet has a first microstructure group. The first microstructure group is disposed correspondingly to the first light-transmitting window and the third light-transmitting window to form the first light output path. The second light guide sheet has a second microstructure group. The second microstructure group is disposed correspondingly to the second light-transmitting window and the fourth light-transmitting window to form the second light output path. The third light guide sheet has a third microstructure group. The third microstructure group is disposed correspondingly to the fifth light-transmitting window to form the third light output path.

In an embodiment of the disclosure, at least one of the first light-isolating area, the second light-isolating area, and the third light-isolating area is a through hole or a notch.

In an embodiment of the disclosure, the backlight module further includes a circuit board. The circuit board is disposed under the base layer and has a first light-emitting element, a second light-emitting element, and a third light-emitting element. The first light-emitting element passes through the first opening and faces a side surface of the first light guide sheet. The second light-emitting element passes through the second opening and faces a side surface of the second light guide sheet. The third light-emitting element sequentially passes through the third opening, the fourth opening, and the fifth opening and faces a side surface of the third light guide sheet.

In an embodiment of the disclosure, the backlight module further includes a cover plate. The cover plate has a first light-transmitting portion, a second light-transmitting portion, and a third light-transmitting portion. Light emitted by the first light-emitting element reaches the first light-transmitting portion through the first light output path. Light emitted by the second light-emitting element reaches the second light-transmitting portion through the second light output path. Light emitted by the third light-emitting element reaches the third light-transmitting portion through the third light output path.

In an embodiment of the disclosure, any of the first light-transmitting portion, the second light-transmitting portion, and the third light-transmitting portion is a graphic, a symbol, a character, or a combination thereof.

In an embodiment of the disclosure, the first light-transmitting portion and the second light-transmitting portion are arranged along a first direction. The third light-transmitting portion is simultaneously opposite to the first light-transmitting portion and the second light-transmitting portion in a second direction perpendicular to the first direction.

In an embodiment of the disclosure, the first light guide sheet and the second light guide sheet are separated from the third light-emitting element through the first light-isolating sheet.

According to an embodiment of the disclosure, a backlight module includes a base layer, a first light-isolating sheet, a first light guide sheet, a first light-shielding sheet, a second light-isolating sheet, a second light guide sheet, a third light guide sheet, and a second light-shielding sheet. The base layer has an opening. The first light-isolating sheet is disposed above the base layer and has a first light-isolating area. The first light guide sheet is disposed in the first light-isolating area. The first light-shielding sheet is disposed above the first light-isolating sheet and has a first light-transmitting window. The second light-isolating sheet is disposed above the first light-shielding sheet and has a second light-isolating area and a third light-isolating area. The second light guide sheet is disposed in the second light-isolating area. The third light guide sheet is disposed in the third light-isolating area. The second light-shielding sheet is disposed above the second light-isolating sheet and has a second light-transmitting window, a third light-transmitting window, and a fourth light-transmitting window. The first light-transmitting window and the second light-transmitting window are disposed correspondingly to form a first light output path. The third light-transmitting window forms a second light output path. The fourth light-transmitting window forms a third light output path.

In an embodiment of the disclosure, the first light guide sheet has a first microstructure group. The first microstructure group is disposed correspondingly to the first light-transmitting window and the second light-transmitting window to form the first light output path. The second light guide sheet has a second microstructure group. The second microstructure group is disposed correspondingly to the third light-transmitting window to form the second light output path. The third light guide sheet has a third microstructure group. The third microstructure group is disposed correspondingly to the fourth light-transmitting window to form the third light output path.

In an embodiment of the disclosure, at least one of the second light-isolating area and the third light-isolating area is a through hole or a notch.

In an embodiment of the disclosure, the backlight module further includes a circuit board. The circuit board is disposed under the base layer and has a first light-emitting element, a second light-emitting element, and a third light-emitting element. The first light-emitting element passes through the opening and faces a side surface of the first light guide sheet. The second light-emitting element is laterally located at an identical side of the base layer, the first light-isolating sheet, the first light-shielding sheet, and the second light-isolating sheet and faces a side surface of the second light guide sheet. The third light-emitting element is laterally located at the identical side of the base layer, the first light-isolating sheet, the first light-shielding sheet, and the second light-isolating sheet and faces a side surface of the third light guide sheet.

In an embodiment of the disclosure, the backlight module further includes a cover plate. The cover plate has a first light-transmitting portion, a second light-transmitting portion, and a third light-transmitting portion. Light emitted by the first light-emitting element reaches the third light-transmitting portion through the first light output path. Light emitted by the second light-emitting element reaches the first light-transmitting portion through the second light output path. Light emitted by the third light-emitting element reaches the second light-transmitting portion through the third light output path.

In an embodiment of the disclosure, any of the first light-transmitting portion, the second light-transmitting portion, and the third light-transmitting portion is a graphic, a symbol, a character, or a combination thereof.

In an embodiment of the disclosure, the first light-transmitting portion and the second light-transmitting portion are arranged along a first direction. The third light-transmitting portion is simultaneously opposite to the first light-transmitting portion and the second light-transmitting portion in a second direction perpendicular to the first direction.

In an embodiment of the disclosure, the first light guide sheet is separated from the second light-emitting element and the third light-emitting element through the first light-isolating sheet.

Accordingly, the backlight module of the present disclosure mainly adopts a double-layer light guide structure, in which at least one of the three light output paths passes through two light guide layers at the same time. In this way, the backlight module of the present disclosure only needs the double-layer light guide structure to independently present three display light effects within a limited occupied space. Furthermore, the two light output paths respectively output light from the first light-transmitting portion and the second light-transmitting portion of the cover plate to produce light effects of two key modes (for example, a function mode and an entertainment mode). The aforementioned third light output path outputs light from the third light-transmitting portion of the cover plate to produce an indicating light effect. In an embodiment in which the backlight module integrates a touch function, the third light-transmitting portion can be designed to output light simultaneously when the user's finger touches the first light-transmitting portion or the second light-transmitting portion. By making the third light-transmitting portion face the first light-transmitting portion and the second light-transmitting portion simultaneously in one direction, even if the light effect of the key mode of the first light-transmitting portion or the second light-transmitting portion is blocked by the user's finger, the indicating light effect of the third light-transmitting portion can clearly let the user know whether the first light-transmitting portion or the second light-transmitting portion is successfully touched.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
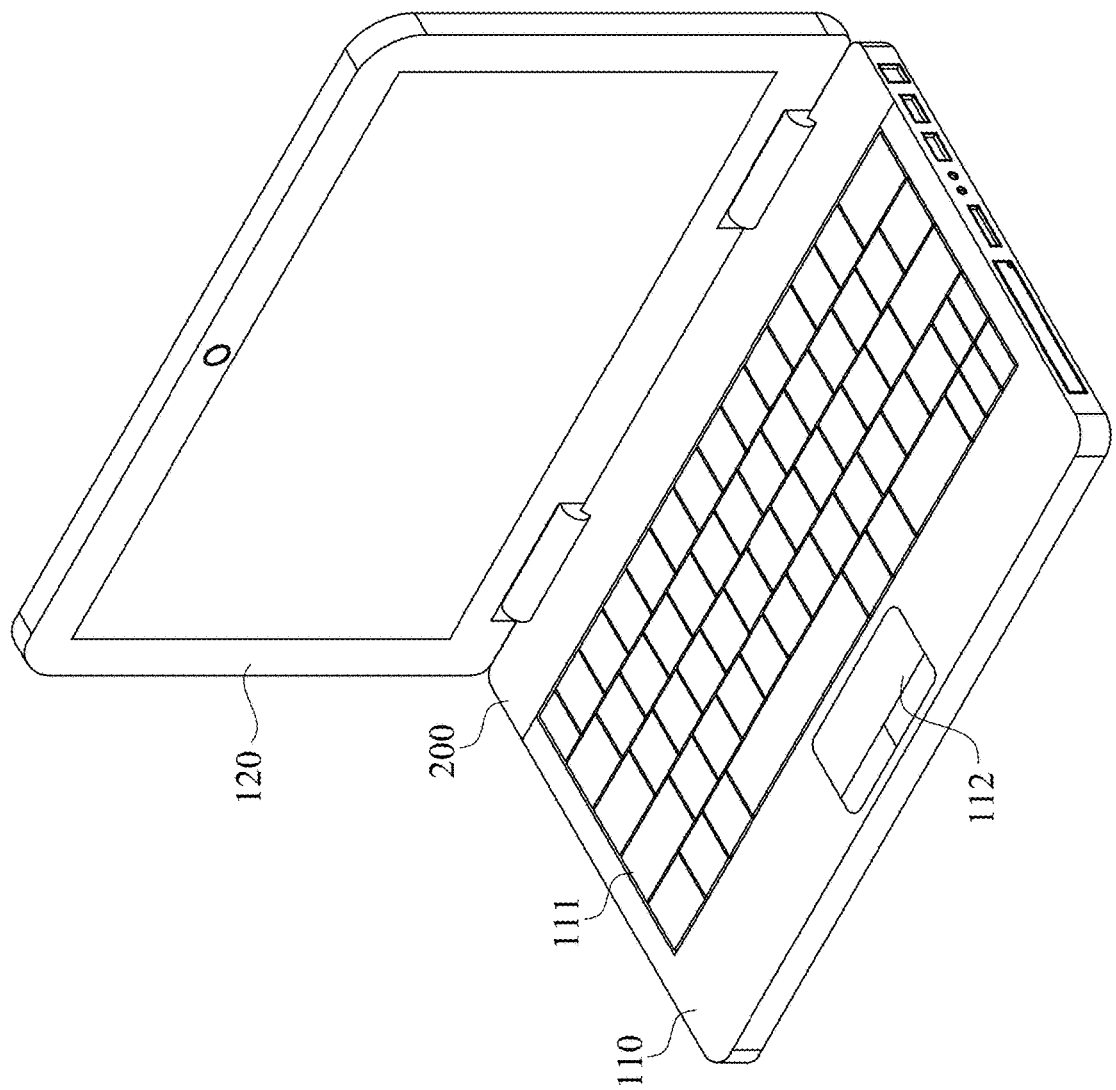
FIG. 1 is a schematic view of an electronic device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic view of an electronic device 100 according to an embodiment of the disclosure. As shown in FIG. 1, in the present embodiment, the electronic device 100 includes a host 110 and a display 120. The host 110 is connected to the display 120 (for example, via a pivotal shaft or a hinge device) and can be flipped over each other. The host 110 includes a keyboard set 111, a touch pad 112, and a backlight module 200. The keyboard set 111 is located between the touch pad 112 and the backlight module 200. The touch pad 112 is located on a side of the keyboard set 111 away from the display 120. The backlight module 200 is located on a side of the keyboard set 111 close to the display 120. Although the electronic device 100 of the present embodiment takes a notebook computer as an example, the present disclosure is not limited thereto. In other words, the concept of the electronic device 100 of the present disclosure can be applied to any electronic product including the backlight module 200. The structures and functions of some components included in the electronic device 100 as well as the connections and operational relationships among these components will be described in detail below.

Figure 2:
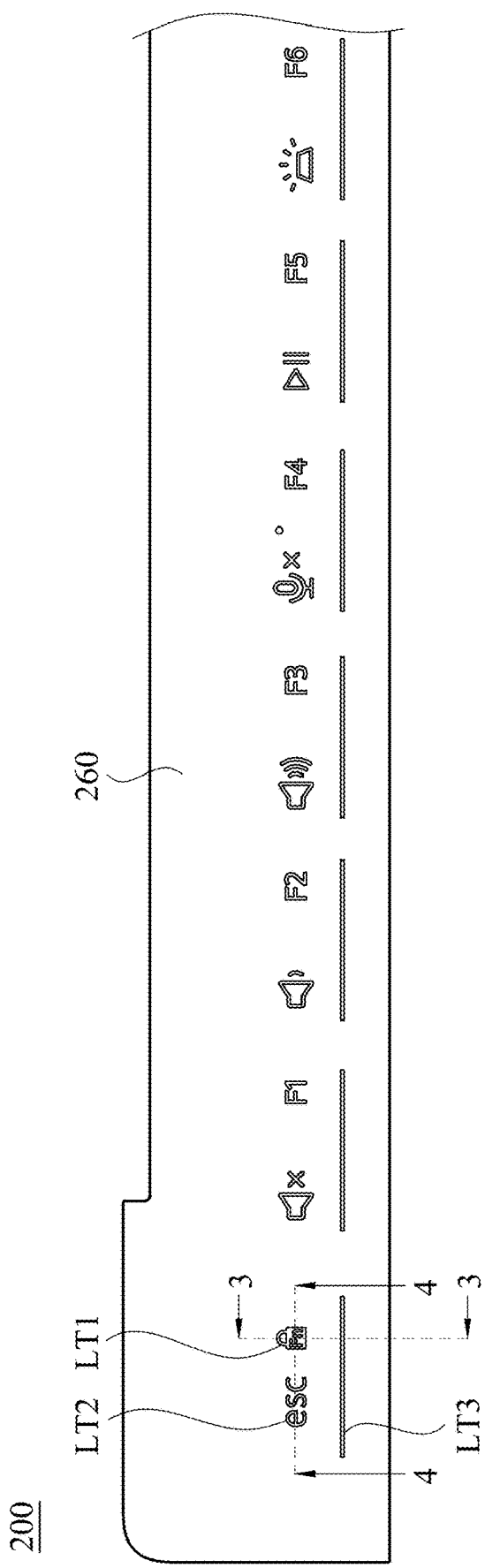
FIG. 2 is a partial top view of a backlight module according to an embodiment of the disclosure.
Figure 2:
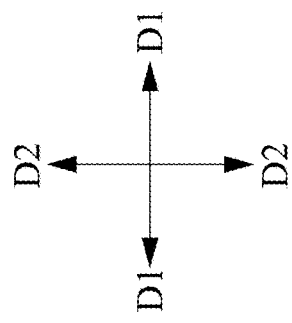

Reference is made to FIG. 2. FIG. 2 is a partial top view of the backlight module 200 according to an embodiment of the disclosure. As shown in FIG. 2, in the present embodiment, the backlight module 200 includes a cover plate 260. The cover plate 260 has a plurality of light-transmitting portions. Any of the light-transmitting portions is a graphic, a symbol, a character, or a combination thereof. Specifically, the cover plate 260 has icon combinations composed of a plurality of sets of first light-transmitting portions LT1, second light-transmitting portions LT2, and third light-transmitting portions LT3. The first light-transmitting portion LT1 in each icon combination is a graphic or a character of a function key, the second light-transmitting portion LT2 in each icon combination is a graphic of a control and adjustment media key, and the third light-transmitting portion LT3 in each icon combination is a graphic located around (e.g., the lower side) the first light-transmitting portion LT1 and the second light-transmitting portion LT2, but the disclosure is not limited thereto. The backlight module 200 can further integrate a touch function and be configured to cause the corresponding light-transmitting portion to emit light in response to being touched. In other words, the backlight module 200 of the present embodiment can replace the top row of physical function keys and control and adjustment media keys in the existing keyboard set.

As shown in FIG. 2, the first light-transmitting portion LT1 and the second light-transmitting portion LT2 in each icon combination are arranged along a first direction D1, and the third light-transmitting portion LT3 is simultaneously opposite to the first light-transmitting portion LT1 and the second light-transmitting portion LT2 in a second direction D2 perpendicular to the first direction D1. In other words, in the embodiment shown in FIG. 2, the third light-transmitting portion LT3 in each icon combination spans the first light-transmitting portion LT1 and the second light-transmitting portion LT2 on an identical side of the first light-transmitting portion LT1 and the second light-transmitting portion LT2.

Figure 3:
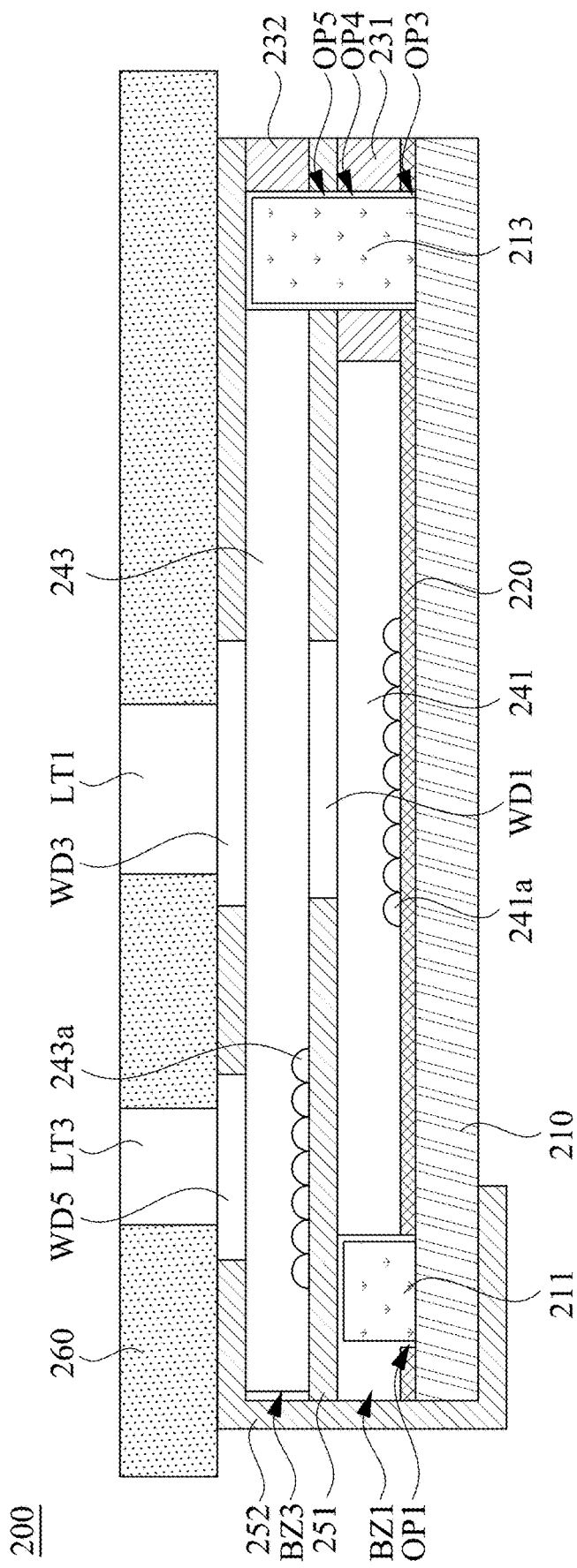
FIG. 3 is a schematic cross-sectional view of the backlight module in FIG. 2 taken along line 3-3 according to an embodiment of the disclosure.
Figure 4:
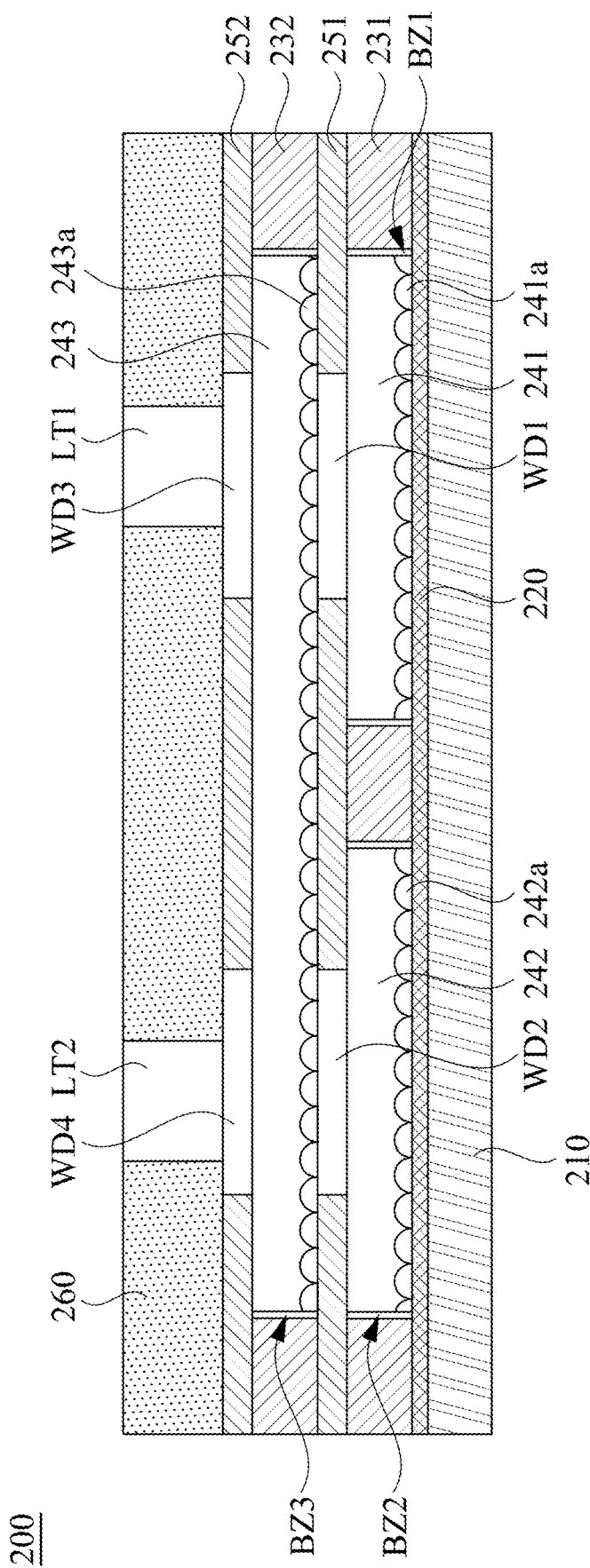
FIG. 4 is a schematic cross-sectional view of the backlight module in FIG. 2 taken along line 4-4 according to an embodiment of the disclosure.
Figure 5:
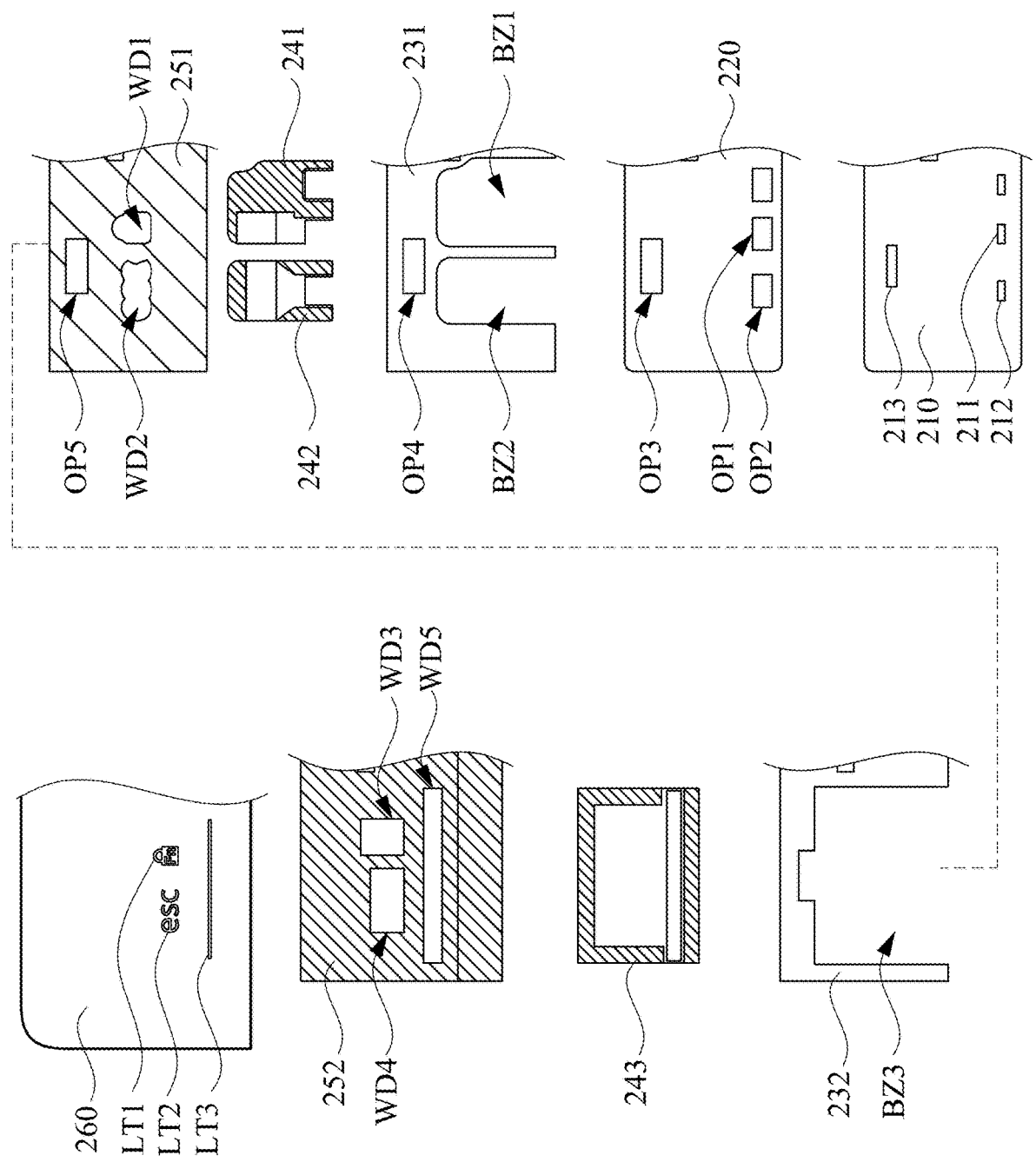
FIG. 5 is a partial exploded view of the backlight module in FIG. 3 according to an embodiment of the disclosure.

Reference is made to FIGS. 3, 4, and 5. FIG. 3 is a schematic cross-sectional view of the backlight module 200 in FIG. 2 taken along line 3-3 according to an embodiment of the disclosure. FIG. 4 is a schematic cross-sectional view of the backlight module 200 in FIG. 2 taken along line 4-4 according to an embodiment of the disclosure. FIG. 5 is a partial exploded view of the backlight module 200 in FIG. 3 according to an embodiment of the disclosure. As shown in FIGS. 3 to 5, the backlight module 200 further includes a base layer 220, a first light-isolating sheet 231, a first light guide sheet 241, a second light guide sheet 242, a first light-shielding sheet 251, a second light-isolating sheet 232, a third light guide sheet 243, and a second light-shielding sheet 252. The base layer 220 has a first opening OP1, a second opening OP2, and a third opening OP3. The first light-isolating sheet 231 is disposed above the base layer 220 and has a first light-isolating area BZ1, a second light-isolating area BZ2, and a fourth opening OP4. The first light guide sheet 241 is disposed in the first light-isolating area BZ1. The second light guide sheet 242 is disposed in the second light-isolating area BZ2. The first light-shielding sheet 251 is disposed above the first light-isolating sheet 231 and has a first light-transmitting window WD1, a second light-transmitting window WD2, and a fifth opening OP5. The third opening OP3, the fourth opening OP4, and the fifth opening OP5 are disposed correspondingly. As shown in FIG. 3, the third opening OP3, the fourth opening OP4, and the fifth opening OP5 are aligned in a stacking direction of the base layer 220, the first light-isolating sheet 231, and the first light-shielding sheet 251. The second light-isolating sheet 232 is disposed above the first light-shielding sheet 251 and has a third light-isolating area BZ3. The third light guide sheet 243 is disposed in the third light-isolating area BZ3. The second light-shielding sheet 252 is disposed above the second light-isolating sheet 232 and has a third light-transmitting window WD3, a fourth light-transmitting window WD4, and a fifth light-transmitting window WD5. As shown in FIGS. 3 and 4, the first light-transmitting window WD1 and the third light-transmitting window WD3 are disposed correspondingly (i.e., aligned in the aforementioned stacking direction) to form a first light output path. As shown in FIG. 4, the second light-transmitting window WD2 and the fourth light-transmitting window WD4 are disposed correspondingly (i.e., aligned in the aforementioned stacking direction) to form a second light output path. As shown in FIG. 3, the fifth light-transmitting window WD5 forms a third light output path.

Furthermore, as shown in FIGS. 3 and 4, in the present embodiment, the first light guide sheet 241 has a first microstructure group 241a. The first microstructure group 241a is disposed on a side of the first light guide sheet 241 facing the base layer 220. The first microstructure group 241a is disposed correspondingly to the first light-transmitting window WD1 of the first light-shielding sheet 251 and the third light-transmitting window WD3 of the second light-shielding sheet 252 (i.e., aligned in the aforementioned stacking direction) to form the first light output path. The second light guide sheet 242 has a second microstructure group 242a. The second microstructure group 242a is disposed on a side of the second light guide sheet 242 facing the base layer 220. The second microstructure group 242a is disposed correspondingly to the second light-transmitting window WD2 of the first light-shielding sheet 251 and the fourth light-transmitting window WD4 of the second light-shielding sheet 252 (i.e., aligned in the aforementioned stacking direction) to form the second light output path. The third light guide sheet 243 has a third microstructure group 243a. The third microstructure group 243a is disposed on a side of the third light guide sheet 243 facing the first light-shielding sheet 251. The third microstructure group 243a is disposed correspondingly to the fifth light-transmitting window WD5 of the second light-shielding sheet 252 (i.e., aligned in the aforementioned stacking direction) to form the third light output path.

In the embodiment shown in FIGS. 3 and 4, the first microstructure group 241a, the second microstructure group 242a, and the third microstructure group 243a are surface recessed microstructures, but the disclosure is not limited thereto.

As shown in FIGS. 3 to 5, the backlight module 200 further includes a circuit board 210. The circuit board 210 is disposed under the base layer 220 and has a first light-emitting element 211, a second light-emitting element 212, and a third light-emitting element 213. The first light-emitting element 211 passes through the first opening OP1 of the base layer 220 and faces a side surface of the first light guide sheet 241. The second light-emitting element 212 passes through the second opening OP2 of the base layer 220 and faces a side surface of the second light guide sheet 242. The third light-emitting element 213 sequentially passes through the third opening OP3 of the base layer 220, the fourth opening OP4 of the first light-isolating sheet 231, and a fifth opening OP5 of the first light-shielding sheet 251 and faces a side surface of the third light guide sheet 243. It can be seen from this that, the first light guide sheet 241 and the second light guide sheet 242 are separated from the third light-emitting element 213 through the first light-isolating sheet 231, so that light emitted by the third light-emitting element 213 will be blocked by the first light-isolating sheet 231 and will not enter the first light guide sheet 241 and the second light guide sheet 242. Light emitted by the first light-emitting element 211 reaches the first light-transmitting portion LT1 through the first light output path. Light emitted by the second light-emitting element 212 reaches the second light-transmitting portion LT2 through the second light output path. The light emitted by the third light-emitting element 213 reaches the third light-transmitting portion LT3 through the third light output path.

From the foregoing structural configurations, it can be seen that the backlight module 200 of the present embodiment mainly adopts a double-layer light guide structure, in which one layer of the light guide structure includes the first light guide sheet 241 and the second light guide sheet 242, and the other layer of the light guide structure includes the third light guide sheet 243. The first light output path and the second light output path pass through different layers of the light guide structure at the same time (the first light output path passes through the first light guide sheet 241 and the third light guide sheet 243, and the second light output path passes through the second light guide sheet 242 and the third light guide sheet 243). In this way, the backlight module 200 of the present embodiment only needs the double-layer light guide structure to independently present three display light effects within a limited occupied space. For example, the first light output path and the second light output path output the light from the first light transmitting portion LT1 and the second light transmitting portion LT2 respectively, and are used to produce light effects of two key modes (e.g., a function mode and an entertainment mode) respectively. The third light output path outputs the light from the third light-transmitting portion LT3 of the cover plate 260 to generate an indicating light effect.

In some embodiments, a material of the cover plate 260 includes glass or plastic, but the present disclosure is not limited thereto. In some embodiments, the aforementioned plastic includes polyester resin (Mylar), but the present disclosure is not limited thereto.

In some embodiments, the cover plate 260 includes a basal layer, a semi-transparent layer, and an opaque layer (not shown). In some embodiments, semi-transparent ink can be coated on the bottom surface of the basal layer through a coating process to form the semi-transparent layer. In some embodiments, light-shielding ink can be coated on a side of the semi-transparent layer away from the basal layer through a coating process to form the opaque layer. The opaque layer has a hollow area. Through the aforementioned structural configurations, the light reaching the cover plate 260 from below will sequentially pass through the hollow area in the opaque layer, the semi-transparent layer, and the basal layer and then leave the cover plate 260. The area where the user can see the light emitted by the first light-emitting element 211 above the cover plate 260 is the first light-transmitting portion LT1. The area where the user can see the light emitted by the second light-emitting element 212 above the cover plate 260 is the second light-transmitting portion LT2. The area where the user can see the light emitted by the third light-emitting element 213 above the cover plate 260 is the third light-transmitting portion LT3.

In some embodiments, the base layer 220 is a soda lime glass layer, but the disclosure is not limited thereto.

In some embodiments, a material of at least one of the first light-isolating sheet 231 and the second light-isolating sheet 232 includes plastic, but the present disclosure is not limited thereto. In some embodiments, the aforementioned plastic includes polycarbonate (PC), but the present disclosure is not limited thereto.

In some embodiments, a material of the first light-shielding sheet 251 includes plastic, but the present disclosure is not limited thereto. In some embodiments, the aforementioned plastic includes polyethylene terephthalate (PET), but the present disclosure is not limited thereto. In some embodiments, the first light-shielding sheet 251 achieves light-shielding effect by printing black material, and unprinted portions form the first light-transmitting window WD1 and the second light-transmitting window WD2.

In some embodiments, the second light-shielding sheet 252 is a black film with light transmission in central areas (i.e., the third light-transmitting window WD3, the fourth light-transmitting window WD4, and the fifth light-transmitting window WD5), but the present disclosure is not limited thereto. In some embodiments, as shown in FIG. 3, the second light-shielding sheet 252 can at least cover a lateral edge of the third light guide sheet 243, the first light-shielding sheet 251, the first light guide sheet 241, the second light guide sheet 242, the base layer 220, and the circuit board 210 to prevent lateral light leakage and prevent moisture from entering the backlight module 200.

In some embodiments, at least one of the first light-emitting element 211, the second light-emitting element 212, and the third light-emitting element 213 is a light-emitting diode, but the disclosure is not limited thereto.

In some embodiments, the backlight module 200 integrates a touch function and can be designed so that the third light-transmitting portion LT3 outputs light simultaneously when the user's finger touches the first light-transmitting portion LT1 or the second light-transmitting portion LT2. In some embodiments, as mentioned above, the first light-transmitting portion LT1 and the second light-transmitting portion LT2 are arranged along the first direction D1, and the third light-transmitting portion LT3 is simultaneously opposite to the first light-transmitting portion LT1 and the second light-transmitting portion LT2 in the second direction D2 perpendicular to the first direction D1. In other words, the third light-transmitting portion LT3 spans the first light-transmitting portion LT1 and the second light-transmitting portion LT2 on an identical side of the first light-transmitting portion LT1 and the second light-transmitting portion LT2. In this way, even if the light effect of the key mode of the first light-transmitting portion LT1 or the second light-transmitting portion LT2 is blocked by the user's finger, the indicating light effect of the third light-transmitting portion LT3 can clearly let the user know whether the first light-transmitting portion LT1 or the second light-transmitting portion LT2 is successfully touched.

As shown in FIG. 5, in the present embodiment, the first light-isolating area BZ1 and the second light-isolating area BZ2 of the first light-isolating sheet 231 and the third light-isolating area BZ3 of the second light-isolating sheet 232 are notches formed by being recessed from side surfaces, but the present disclosure is not limited thereto.

Figure 6:
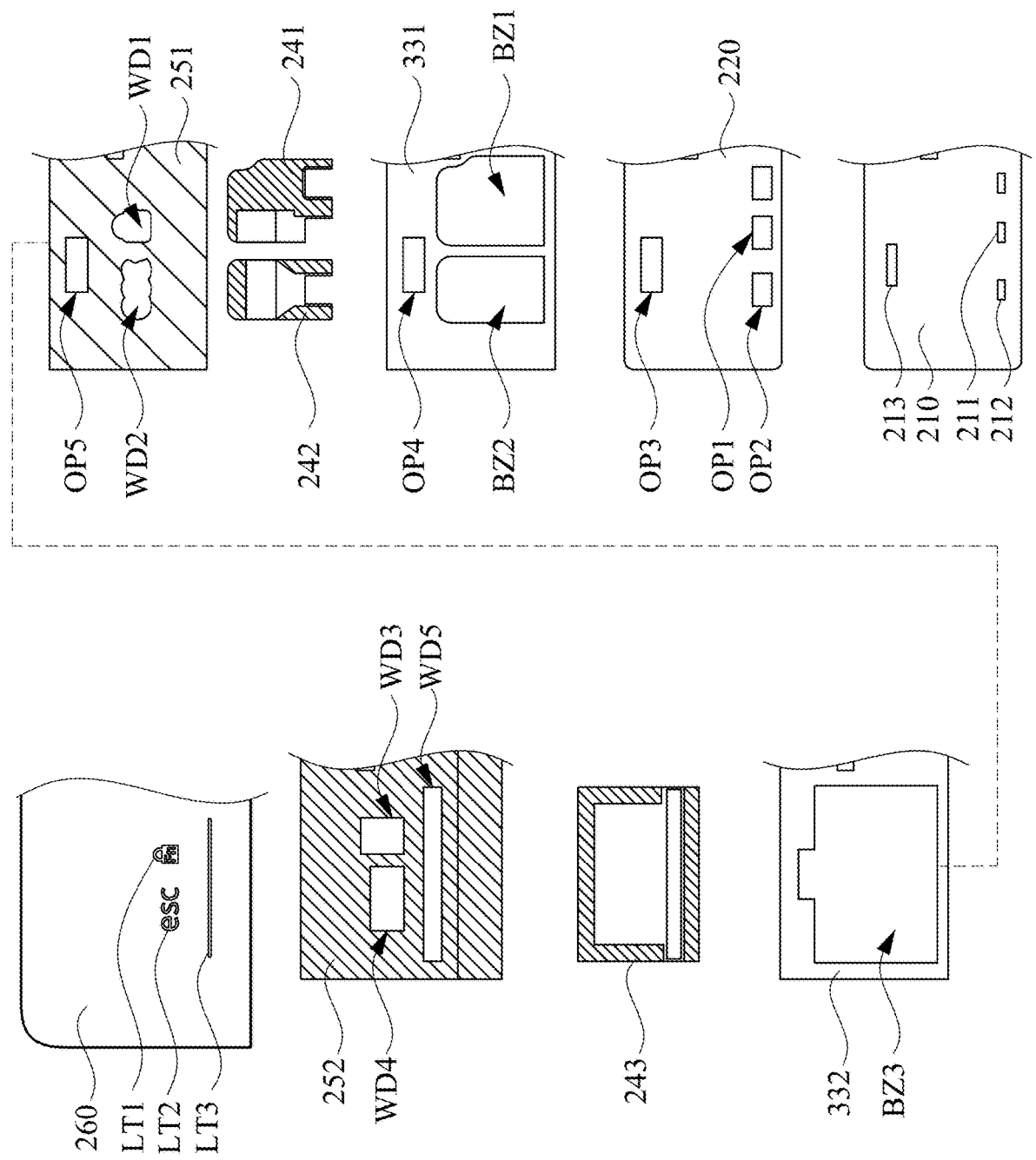
FIG. 6 is a partial exploded view of a backlight module according to another embodiment of the disclosure.

Reference is made to FIG. 6. FIG. 6 is a partial exploded view of a backlight module 300 according to another embodiment of the disclosure. As shown in FIG. 6, in the present embodiment, the backlight module 300 includes a circuit board 210, a base layer 220, a first light-isolating sheet 331, a first light guide sheet 241, a second light guide sheet 242, a first light-shielding sheet 251, a second light-isolating sheet 332, and a third light guide sheet 243, a second light-shielding sheet 252, and a cover plate 260, in which the circuit board 210, the base layer 220, the first light guide sheet 241, the second light guide sheet 242, the first light-shielding sheet 251, the third light guide sheet 243, the second light-shielding sheet 252, and the cover plate 260 are the same as the embodiment shown in FIG. 5. Therefore, reference can be made to the foregoing relevant descriptions, which will not be described again here. A difference between the present embodiment and the embodiment shown in FIG. 5 is that the first light-isolating area BZ1 and the second light-isolating area BZ2 of the first light-isolating sheet 331 and the third light-isolating area BZ3 of the second light-isolating sheet 332 of the present embodiment are closed through holes.

In practical applications, at least one of the first light-isolating area BZ1 and the second light-isolating area BZ2 of the first light-isolating sheet 331 and the third light-isolating area BZ3 of the second light-isolating sheet 332 is a through hole or a notch. That is, they can be any combination of through holes and notches.

Figure 7:
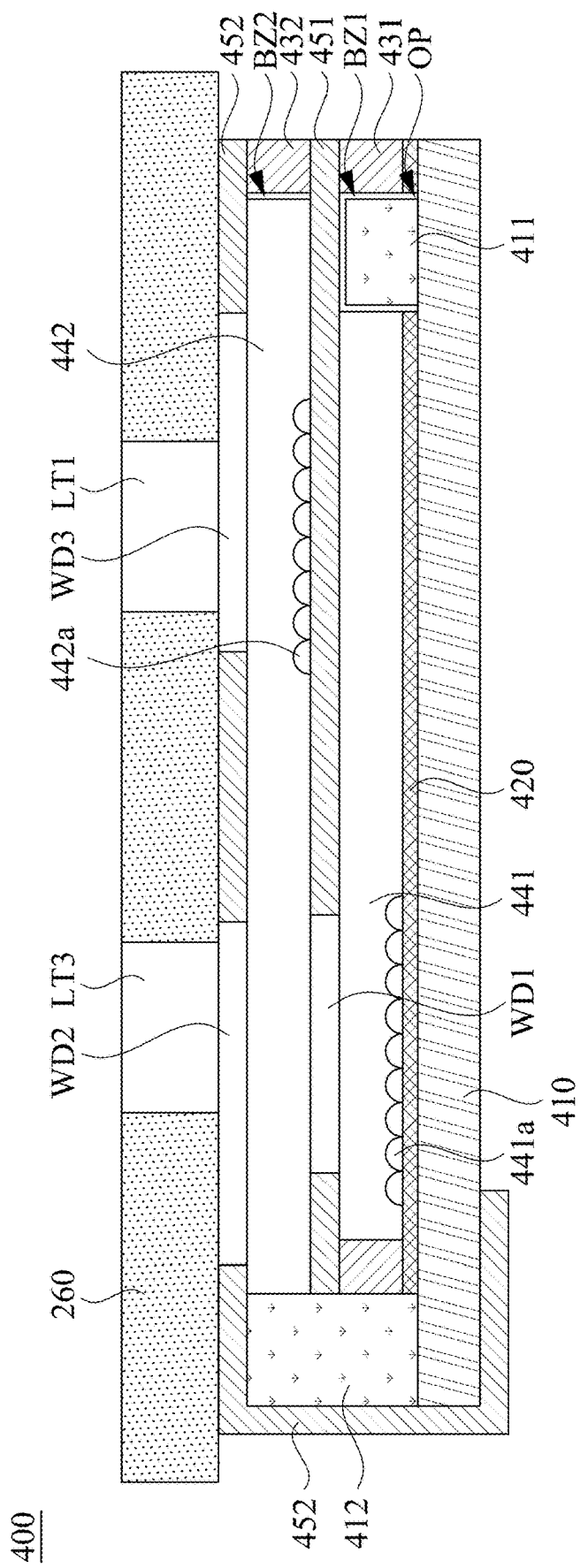
FIG. 7 is a schematic cross-sectional view of a backlight module according to another embodiment of the disclosure taken along line 3-3 in FIG. 2.
Figure 8:
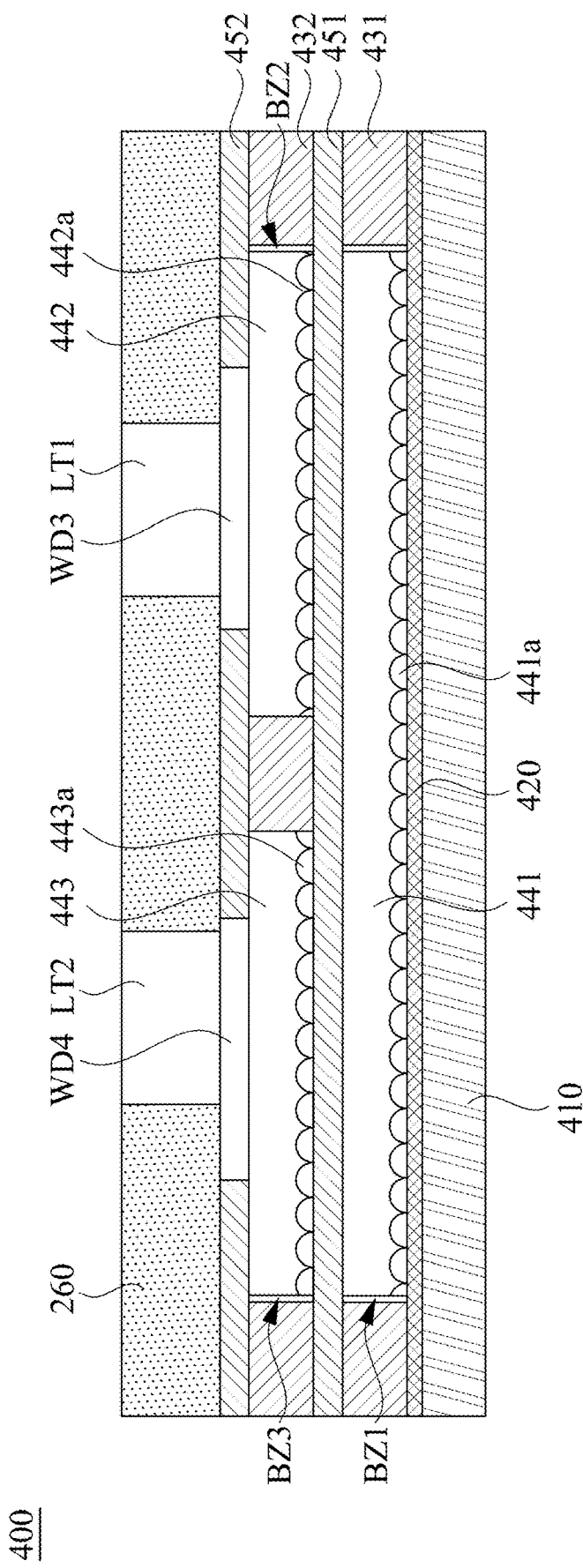
FIG. 8 is a schematic cross-sectional view of a backlight module according to another embodiment of the disclosure taken along line 4-4 in FIG. 2.
Figure 9:
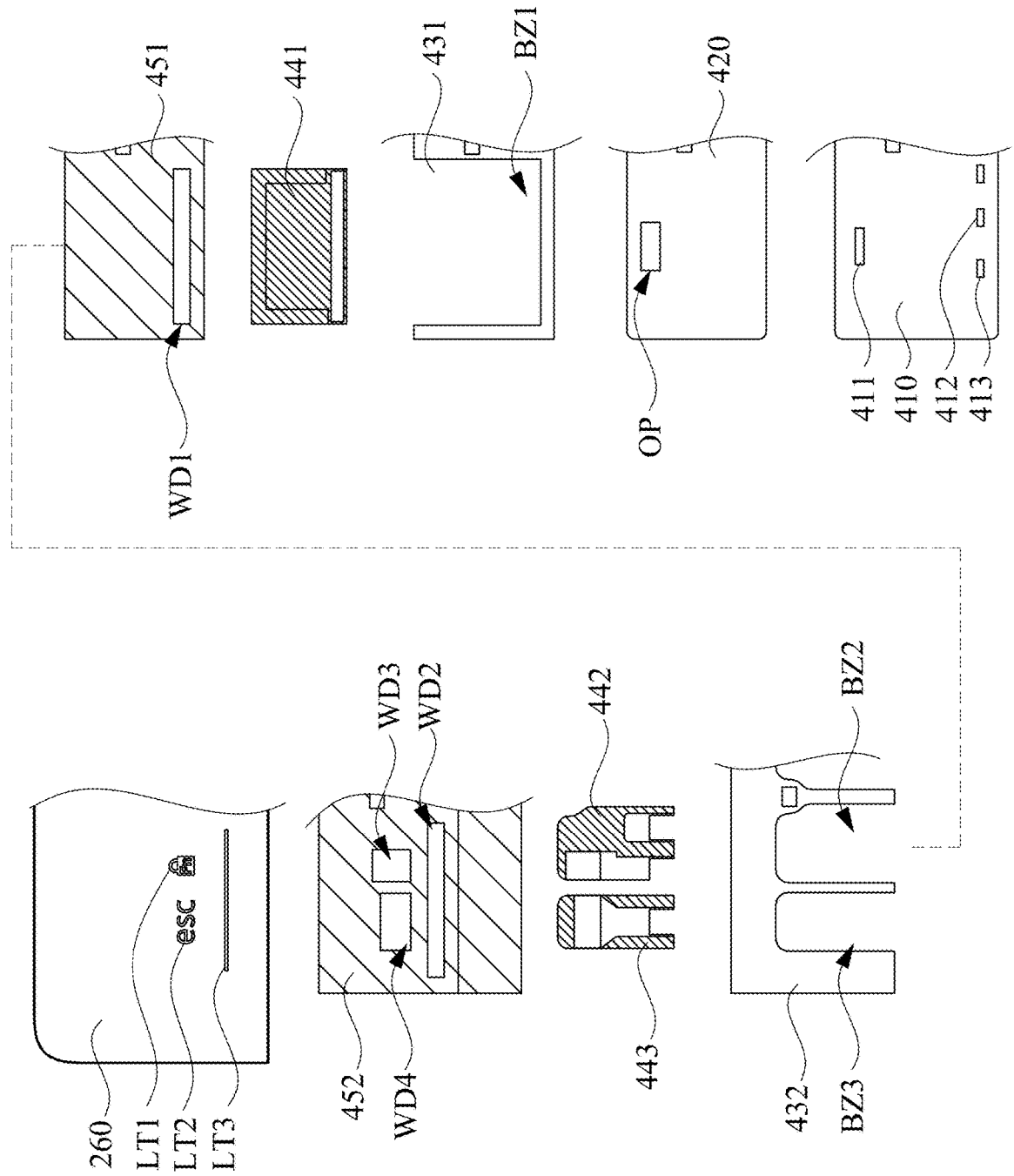
FIG. 9 is a partial exploded view of the backlight module in FIG. 7 according to an embodiment of the disclosure.

Reference is made to FIGS. 7, 8, and 9. FIG. 7 is a schematic cross-sectional view of a backlight module 400 according to another embodiment of the disclosure taken along line 3-3 in FIG. 2. FIG. 8 is a schematic cross-sectional view of the backlight module 400 according to another embodiment of the disclosure taken along line 4-4 in FIG. 2. FIG. 9 is a partial exploded view of the backlight module 400 in FIG. 7 according to an embodiment of the disclosure. As shown in FIGS. 7 to 9, the backlight module 400 includes a circuit board 410, a base layer 420, a first light-isolating sheet 431, a first light guide sheet 441, a first light-shielding sheet 451, a second light-isolating sheet 432, a second light guide sheet 442, a third light guide sheet 443, a second light-shielding sheet 452, and the cover plate 260, in which the cover plate 260 is the same as the embodiment shown in FIG. 5. Therefore, reference can be made to the foregoing relevant descriptions, which will not be described again here. The base layer 420 has an opening OP. The circuit board 410 is disposed under the base layer 420 and has a first light-emitting element 411, a second light-emitting element 412, and a third light-emitting element 413. The first light-emitting element 411 passes through the opening OP of the base layer 420 and faces a side surface of the first light guide sheet 441. The first light-isolating sheet 431 is disposed above the base layer 420 and has a first light-isolating area BZ1. The first light guide sheet 441 is disposed in the first light-isolating area BZ1. The first light-shielding sheet 451 is disposed above the first light-isolating sheet 431 and has a first light-transmitting window WD1. The second light-isolating sheet 432 is disposed above the first light-shielding sheet 451 and has a second light-isolating area BZ2 and a third light-isolating area BZ3. The second light guide sheet 442 is disposed in the second light-isolating area BZ2. The third light guide sheet 443 is disposed in the third light-isolating area BZ3. The second light-shielding sheet 452 is disposed above the second light-isolating sheet 432 and has a second light-transmitting window WD2, a third light-transmitting window WD3, and a fourth light-transmitting window WD4. As shown in FIG. 7, the first light-transmitting window WD1 and the second light-transmitting window WD2 are disposed correspondingly (i.e., aligned in the aforementioned stacking direction) to form a first light output path. As shown in FIG. 8, the third light-transmitting window WD3 forms a second light output path. As shown in FIG. 8, the fourth light-transmitting window WD4 forms a third light output path. The second light-emitting element 412 is laterally located at an identical side of the base layer 420, the first light-isolating sheet 431, the first light-shielding sheet 451, and the second light-isolating sheet 432 and faces a side surface of the second light guide sheet 442. The third light-emitting element 413 is laterally located at the identical side of the base layer 420, the first light-isolating sheet 431, the first light-shielding sheet 451, and the second light-isolating sheet 432 and faces a side surface of the third light guide sheet 443. It can be seen from this that, the first light guide sheet 441 is separated from the second light-emitting element 412 and the third light-emitting element 413 through the first light-isolating sheet 431, so that lights emitted by the second light-emitting element 412 and the third light-emitting element 413 will be blocked by the first light-isolating sheet 431 and will not enter the first light guide sheet 441. Light emitted by the first light-emitting element 411 reaches the third light-transmitting portion LT3 through the first light output path. The light emitted by the second light-emitting element 412 reaches the first light-transmitting portion LT1 through the second light output path. The light emitted by the third light-emitting element 413 reaches the second light-transmitting portion LT2 through the third light output path.

Furthermore, as shown in FIGS. 7 and 8, in the present embodiment, the first light guide sheet 441 has a first microstructure group 441*a*. The first microstructure group 441*a* is disposed on a side of the first light guide sheet 441 facing the base layer 420. The first microstructure group 441*a* is disposed correspondingly to the first light-transmitting window WD1 of the first light-shielding sheet 451 and the second light-transmitting window WD2 of the second light-shielding sheet 452 (i.e., aligned in the aforementioned stacking direction) to form the first light output path. The second light guide sheet 442 has a second microstructure group 442*a*. The second microstructure group 442*a* is disposed on a side of the second light guide sheet 442 facing the first light-shielding sheet 451. The second microstructure group 442*a* is disposed correspondingly to the third light-transmitting window WD3 of the second light-shielding sheet 452 (i.e., aligned in the aforementioned stacking direction) to form the second light output path. The third light guide sheet 443 has a third microstructure group 443*a*. The third microstructure group 443*a* is disposed on a side of the third light guide sheet 443 facing the first light-shielding sheet 451. The third microstructure group 443*a* is disposed correspondingly to the fourth light-transmitting window WD4 of the second light-shielding sheet 452 (i.e., aligned in the aforementioned stacking direction) to form the third light output path.

In the embodiment shown in FIGS. 7 and 8, the first microstructure group 441*a*, the second microstructure group 442*a*, and the third microstructure group 443*a* are surface recessed microstructures, but the disclosure is not limited thereto.

From the foregoing structural configurations, it can be seen that the backlight module 400 of the present embodiment mainly adopts a double-layer light guide structure, in which one layer of the light guide structure includes the first light guide sheet 441, and the other layer of the light guide structure includes the second light guide sheet 442 and the third light guide sheet 443. The first light output path passes through different layers of the light guide structure at the same time (the first light output path passes through the first light guide sheet 441, the second light guide sheet 442, and the third light guide sheet 443). In this way, the backlight module 400 of the present embodiment only needs the double-layer light guide structure to independently present three display light effects within a limited occupied space. For example, the second light output path and the third light output path output the light from the first light transmitting portion LT1 and the second light transmitting portion LT2 respectively, and are used to produce light effects of two key modes (e.g., a function mode and an entertainment mode) respectively. The first light output path outputs the light from the third light-transmitting portion LT3 of the cover plate 260 to generate an indicating light effect.

In some embodiments, as mentioned above, the cover plate 260 includes the basal layer, the semi-transparent layer, and the opaque layer (not shown). The area where the user can see the light emitted by the second light-emitting element 412 above the cover plate 260 is the first light-transmitting portion LT1. The area where the user can see the light emitted by the third light-emitting element 413 above the cover plate 260 is the second light-transmitting portion LT2. The area where the user can see the light emitted by the first light-emitting element 411 above the cover plate 260 is the third light-transmitting portion LT3.

In some embodiments, the base layer 420 is a soda lime glass layer, but the disclosure is not limited thereto.

In some embodiments, a material of at least one of the first light-isolating sheet 431 and the second light-isolating sheet 432 includes plastic, but the present disclosure is not limited thereto. In some embodiments, the aforementioned plastic includes polycarbonate, but the present disclosure is not limited thereto.

In some embodiments, a material of the first light-shielding sheet 451 includes plastic, but the present disclosure is not limited thereto. In some embodiments, the aforementioned plastic includes polyethylene terephthalate, but the present disclosure is not limited thereto. In some embodiments, the first light-shielding sheet 451 achieves light-shielding effect by printing black material, and an unprinted portion forms the first light-transmitting window WD1.

In some embodiments, the second light-shielding sheet 452 is a black film with light transmission in central areas (i.e., the second light-transmitting window WD2, the third light-transmitting window WD3, and the fourth light-transmitting window WD4), but the present disclosure is not limited thereto. In some embodiments, as shown in FIG. 7, the second light-shielding sheet 452 can at least cover a lateral edge of the third light guide sheet 443, the first light-shielding sheet 451, the first light guide sheet 441, the second light guide sheet 442, the base layer 420, and the circuit board 410 to prevent lateral light leakage and prevent moisture from entering the backlight module 400.

In some embodiments, at least one of the first light-emitting element 411, the second light-emitting element 412, and the third light-emitting element 413 is a light-emitting diode, but the disclosure is not limited thereto.

As shown in FIG. 9, in the present embodiment, the first light-isolating area BZ1 of the first light-isolating sheet 431 and the second light-isolating area BZ2 and the third light-isolating area BZ3 of the second light-isolating sheet 432 are notches formed by being recessed from side surfaces, but the present disclosure is not limited thereto.

Figure 10:
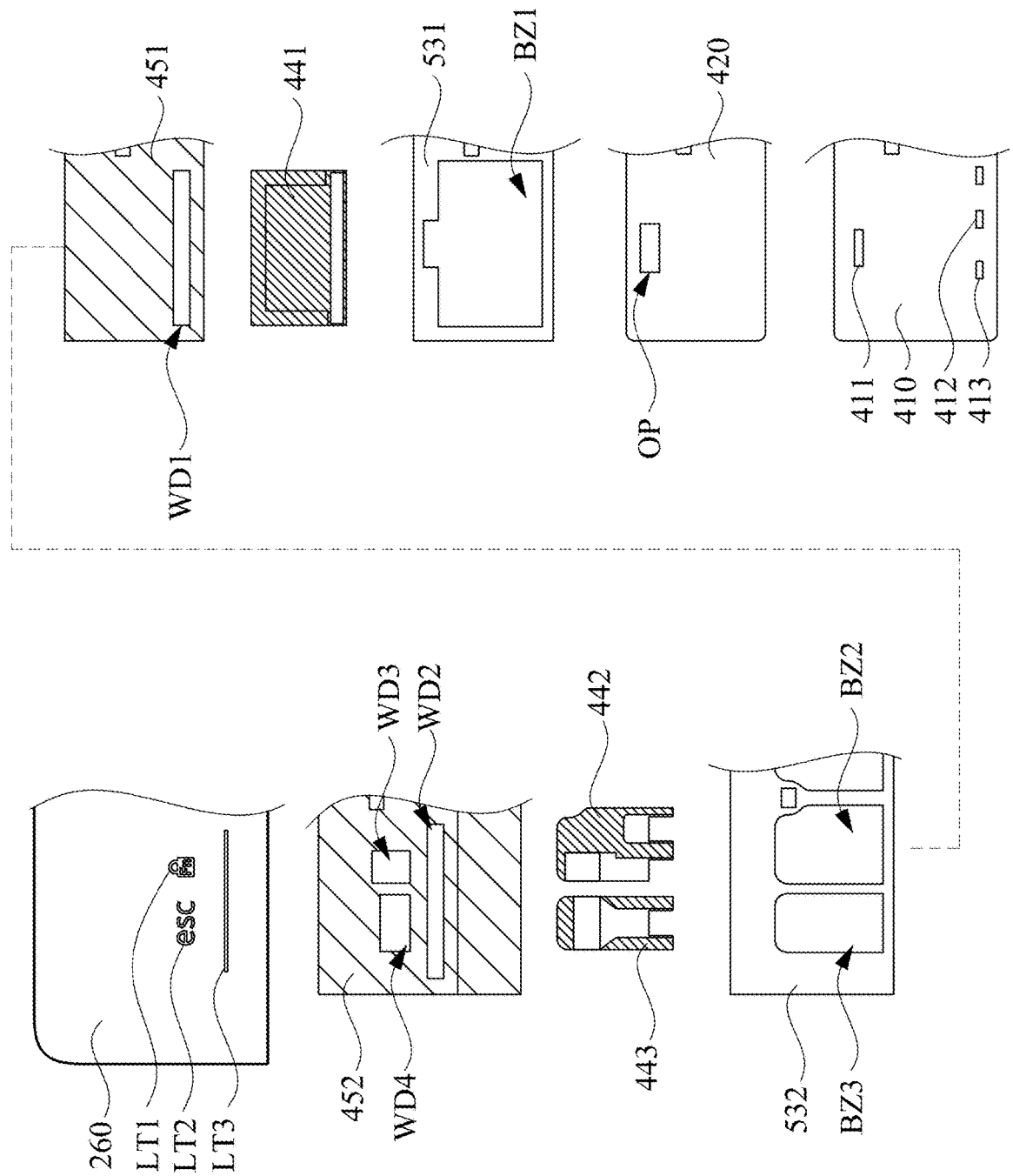
FIG. 10 is a partial exploded view of a backlight module according to another embodiment of the disclosure.

Reference is made to FIG. 10. FIG. 10 is a partial exploded view of a backlight module 500 according to another embodiment of the disclosure. As shown in FIG. 10, in the present embodiment, the backlight module 500 includes a circuit board 410, a base layer 420, a first light-isolating sheet 531, a first light guide sheet 441, a first light-shielding sheet 451, a second light-isolating sheet 532, a second light guide sheet 442, a third light guide sheet 443, a second light-shielding sheet 452, and the cover plate 260, in which the circuit board 410, the base layer 420, the first light guide sheet 441, the first light-shielding sheet 451, the second light guide sheet 442, the third light guide sheet 443, the second light-shielding sheet 452, and the cover plate 260 are the same as the embodiment shown in FIG. 9. Therefore, reference can be made to the foregoing relevant descriptions, which will not be described again here. A difference between the present embodiment and the embodiment shown in FIG. 9 is that the first light-isolating area BZ1 of the first light-isolating sheet 531 and the second light-isolating area BZ2 and the third light-isolating area BZ3 of the second light-isolating sheet 532 of the present embodiment are closed through holes.

In practical applications, at least one of the first light-isolating area BZ1 of the first light-isolating sheet 431 and the second light-isolating area BZ2 and the third light-isolating area BZ3 of the second light-isolating sheet 432 is a through hole or a notch. That is, they can be any combination of through holes and notches.

Figure 11:
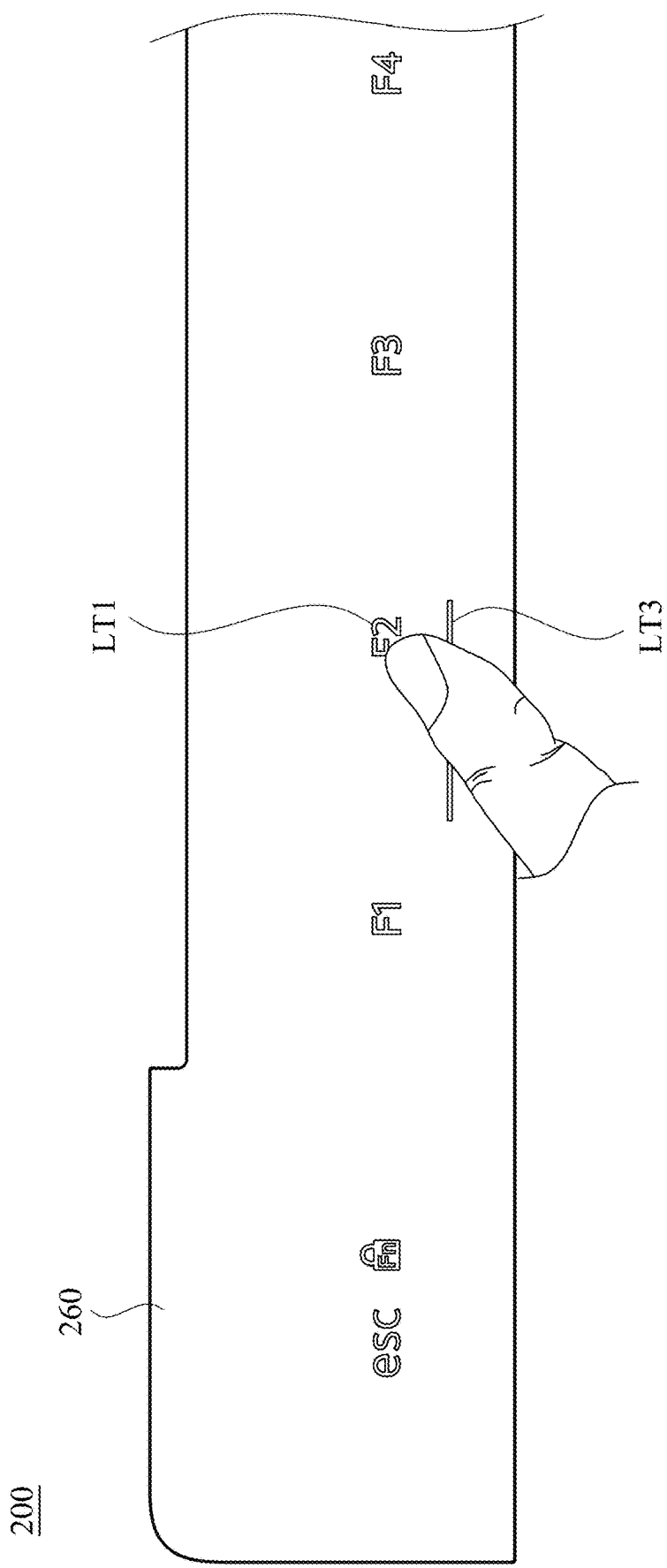
FIG. 11 is a partial top view of a finger touching the backlight module according to an embodiment of the present disclosure.

Reference is made to FIG. 11. FIG. 11 is a partial top view of a finger touching the backlight module 200 according to an embodiment of the present disclosure. As shown in FIG. 11, in an embodiment in which the backlight module 200 integrates a touch function, when the backlight module 200 is in the display light effect of the function mode, the first light-transmitting portion LT1 (i.e., a graphic or a character of a function key) in each icon combination transmits light, and the second light-transmitting portion LT2 (i.e., a graphic of a control and adjustment media key) in each icon combination does not transmit light. When the backlight module 200 is in the display light effect of the entertainment mode, the first light-transmitting portion LT1 (i.e., a graphic or a character of a function key) in each icon combination does not transmit light, and the second light-transmitting portion LT2 (i.e., a graphic of a control and adjustment media key) in each icon combination transmits light. When the user's finger touches the first light-transmitting portion LT1 or the second light-transmitting portion LT2 in one of the icon combinations, the third light-transmitting portion LT3 in the same icon combination output light simultaneously. In this way, even if the light effect of the key mode of the first light-transmitting portion LT1 or the second light-transmitting portion LT2 is blocked by the user's finger, the indicating light effect of the third light-transmitting portion LT3 can clearly let the user know whether the first light-transmitting portion LT1 or the second light-transmitting portion LT2 is successfully touched.

According to the foregoing recitations of the embodiments of the disclosure, it can be seen that the backlight module of the present disclosure mainly adopts a double-layer light guide structure, in which at least one of the three light output paths passes through two light guide layers at the same time. In this way, the backlight module of the present disclosure only needs the double-layer light guide structure to independently present three display light effects within a limited occupied space. Furthermore, the two light output paths respectively output light from the first light-transmitting portion and the second light-transmitting portion of the cover plate to produce light effects of two key modes (for example, a function mode and an entertainment mode). The aforementioned third light output path outputs light from the third light-transmitting portion of the cover plate to produce an indicating light effect. In an embodiment in which the backlight module integrates a touch function, the third light-transmitting portion can be designed to output light simultaneously when the user's finger touches the first light-transmitting portion or the second light-transmitting portion. By making the third light-transmitting portion face the first light-transmitting portion and the second light-transmitting portion simultaneously in one direction, even if the light effect of the key mode of the first light-transmitting portion or the second light-transmitting portion is blocked by the user's finger, the indicating light effect of the third light-transmitting portion can clearly let the user know whether the first light-transmitting portion or the second light-transmitting portion is successfully touched.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:
 a base layer having a first opening, a second opening, and a third opening;
 a first light-isolating sheet disposed above the base layer and having a first light-isolating area, a second light-isolating area, and a fourth opening;
 a first light guide sheet disposed in the first light-isolating area;
 a second light guide sheet disposed in the second light-isolating area;
 a first light-shielding sheet disposed above the first light-isolating sheet and having a first light-transmitting window, a second light-transmitting window, and a fifth opening, wherein the third opening, the fourth opening, and the fifth opening are disposed correspondingly;
 a second light-isolating sheet disposed above the first light-shielding sheet and having a third light-isolating area;
 a third light guide sheet disposed in the third light-isolating area; and
 a second light-shielding sheet disposed above the second light-isolating sheet and having a third light-transmitting window, a fourth light-transmitting window, and a fifth light-transmitting window,
 wherein the first light-transmitting window and the third light-transmitting window are disposed correspondingly to form a first light output path, the second light-transmitting window and the fourth light-transmitting window are disposed correspondingly to form a second light output path, and the fifth light-transmitting window forms a third light output path.

2. The backlight module of claim 1, wherein the first light guide sheet has a first microstructure group, the first microstructure group is disposed correspondingly to the first light-transmitting window and the third light-transmitting window to form the first light output path, the second light guide sheet has a second microstructure group, the second microstructure group is disposed correspondingly to the second light-transmitting window and the fourth light-transmitting window to form the second light output path, the third light guide sheet has a third microstructure group, and the third microstructure group is disposed correspondingly to the fifth light-transmitting window to form the third light output path.

3. The backlight module of claim 1, wherein at least one of the first light-isolating area, the second light-isolating area, and the third light-isolating area is a through hole or a notch.

4. The backlight module of claim 1, further comprising a circuit board disposed under the base layer and having a first light-emitting element, a second light-emitting element, and a third light-emitting element, wherein the first light-emitting element passes through the first opening and faces a side surface of the first light guide sheet, the second light-emitting element passes through the second opening and faces a side surface of the second light guide sheet, and the third light-emitting element sequentially passes through the third opening, the fourth opening, and the fifth opening and faces a side surface of the third light guide sheet.

5. The backlight module of claim 4, further comprising a cover plate having a first light-transmitting portion, a second light-transmitting portion, and a third light-transmitting portion, wherein light emitted by the first light-emitting element reaches the first light-transmitting portion through the first light output path, light emitted by the second light-emitting element reaches the second light-transmitting portion through the second light output path, and light emitted by the third light-emitting element reaches the third light-transmitting portion through the third light output path.

6. The backlight module of claim 5, wherein any of the first light-transmitting portion, the second light-transmitting portion, and the third light-transmitting portion is a graphic, a symbol, a character, or a combination thereof.

7. The backlight module of claim 5, wherein the first light-transmitting portion and the second light-transmitting portion are arranged along a first direction, and the third light-transmitting portion is simultaneously opposite to the first light-transmitting portion and the second light-transmitting portion in a second direction perpendicular to the first direction.

8. The backlight module of claim 4, wherein the first light guide sheet and the second light guide sheet are separated from the third light-emitting element through the first light-isolating sheet.

9. A backlight module, comprising:
a base layer having an opening;
a first light-isolating sheet disposed above the base layer and having a first light-isolating area;
a first light guide sheet disposed in the first light-isolating area;
a first light-shielding sheet disposed above the first light-isolating sheet and having a first light-transmitting window;
a second light-isolating sheet disposed above the first light-shielding sheet and having a second light-isolating area and a third light-isolating area;
a second light guide sheet disposed in the second light-isolating area;
a third light guide sheet disposed in the third light-isolating area; and
a second light-shielding sheet disposed above the second light-isolating sheet and having a second light-transmitting window, a third light-transmitting window, and a fourth light-transmitting window,
wherein the first light-transmitting window and the second light-transmitting window are disposed correspondingly to form a first light output path, the third light-transmitting window forms a second light output path, and the fourth light-transmitting window forms a third light output path.

10. The backlight module of claim 9, wherein the first light guide sheet has a first microstructure group, the first microstructure group is disposed correspondingly to the first light-transmitting window and the second light-transmitting window to form the first light output path, the second light guide sheet has a second microstructure group, the second microstructure group is disposed correspondingly to the third light-transmitting window to form the second light output path, the third light guide sheet has a third microstructure group, and the third microstructure group is disposed correspondingly to the fourth light-transmitting window to form the third light output path.

11. The backlight module of claim 9, wherein at least one of the second light-isolating area and the third light-isolating area is a through hole or a notch.

12. The backlight module of claim 9, wherein further comprising a circuit board disposed under the base layer and having a first light-emitting element, a second light-emitting element, and a third light-emitting element, wherein the first light-emitting element passes through the opening and faces a side surface of the first light guide sheet, the second light-emitting element is laterally located at an identical side of the base layer, the first light-isolating sheet, the first light-shielding sheet, and the second light-isolating sheet and faces a side surface of the second light guide sheet, and the third light-emitting element is laterally located at the identical side of the base layer, the first light-isolating sheet, the first light-shielding sheet, and the second light-isolating sheet and faces a side surface of the third light guide sheet.

13. The backlight module of claim 12, further comprising a cover plate having a first light-transmitting portion, a second light-transmitting portion, and a third light-transmitting portion, wherein light emitted by the first light-emitting element reaches the third light-transmitting portion through the first light output path, light emitted by the second light-emitting element reaches the first light-transmitting portion through the second light output path, and light emitted by the third light-emitting element reaches the second light-transmitting portion through the third light output path.

14. The backlight module of claim 13, wherein any of the first light-transmitting portion, the second light-transmitting portion, and the third light-transmitting portion is a graphic, a symbol, a character, or a combination thereof.

15. The backlight module of claim 13, wherein the first light-transmitting portion and the second light-transmitting portion are arranged along a first direction, and the third light-transmitting portion is simultaneously opposite to the first light-transmitting portion and the second light-transmitting portion in a second direction perpendicular to the first direction.

16. The backlight module of claim 12, wherein the first light guide sheet is separated from the second light-emitting element and the third light-emitting element through the first light-isolating sheet.

* * * * *